L. H. VERVOORT.
BEARING.
APPLICATION FILED SEPT. 18, 1919.
1,344,524.
Patented June 22, 1920.
2 SHEETS—SHEET 1.
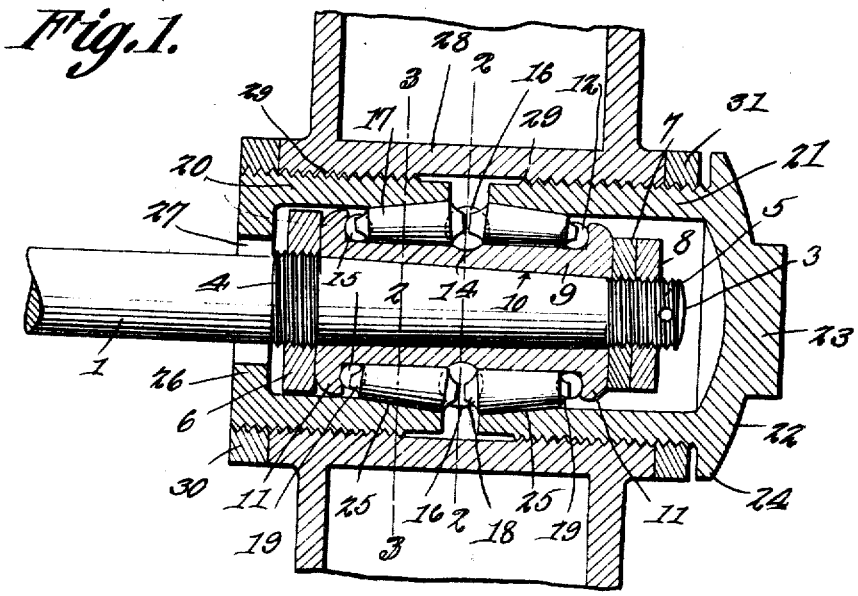
Fig. 1.
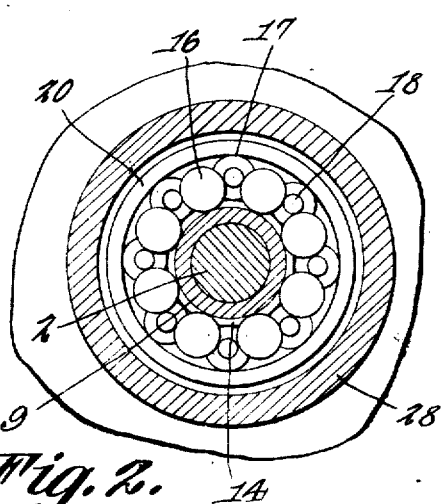
Fig. 2.
Fig. 3.
Inventor,
L. H. Vervoort

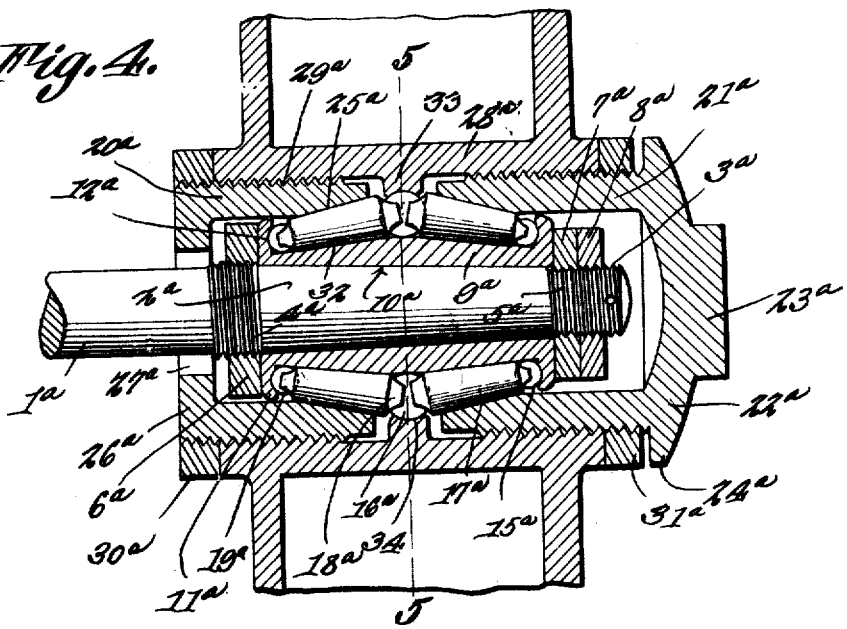
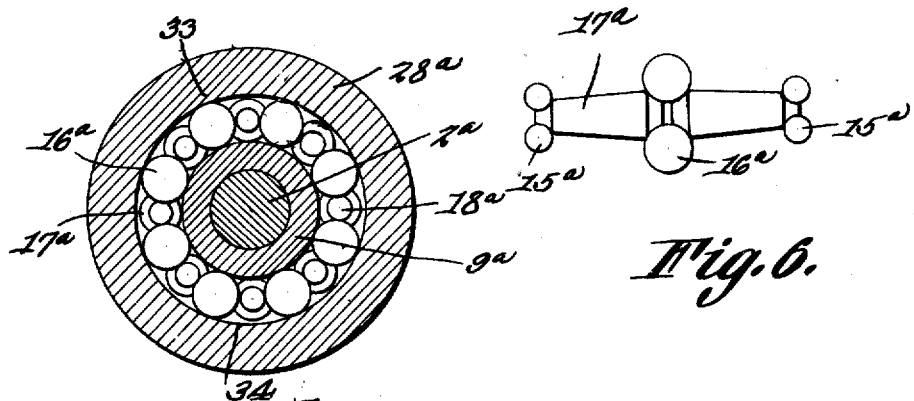

UNITED STATES PATENT OFFICE.

LAMBERT H. VERVOORT, OF NEW YORK, N. Y.

BEARING.

1,344,524.   Specification of Letters Patent.   Patented June 22, 1920.

Application filed September 18, 1919. Serial No. 324,357.

*To all whom it may concern:*

Be it known that I, LAMBERT H. VERVOORT, a citizen of the United States, residing at New York city, in the county of New York and State of New York, have invented a new and useful Bearing, of which the following is a specification.

The device forming the subject matter of this application is a roller bearing, and one object of the invention is to lessen the friction existing at the ends of the rollers, another object being to provide a bearing in which a truss-like action will be produced owing to the tapering of the rollers, a further object of the invention being to provide a structure wherein wear is reduced. The invention aims to provide a bearing which may be adjusted without difficulty for the purpose of repairs, to provide a bearing which will operate with a minimum amount of grease, and to supply the bearing which will not run hot.

Typical embodiments of the invention are shown in the drawing, but, within the scope of what is claimed, changes falling within the skill of a mechanic may be made without departing from the spirit.

In the drawings:—

Figure 1 shows in longitudinal section, a bearing constructed in accordance with the invention;

Fig. 2 is a cross section on the line 2—2 of Fig. 1;

Fig. 3 is a cross section on the line 3—3 of Fig. 1;

Fig. 4 is a longitudinal section showing a modification;

Fig. 5 is a cross section on the line 5—5 of Fig. 4;

Fig. 6 is a plan showing a pair of the rollers and the balls which coact therewith;

Referring to the forms shown in Figs. 1, 2 and 3, there appears a shaft 1 having a tapered part 2 terminating in a tip 3 which is threaded as shown at 5. The shaft 1 is threaded as indicated at 4, at the rear end of the tapered part 2. The numeral 9 denotes a sleeve having a tapered bore 10 in which the part 2 of the shaft 1 is wedged by the action of a nut 7 and a lock nut 8 on the threaded tip 3. A nut 6 on the threaded portion 4 of the shaft 1 may form an abutment for the sleeve 9. The sleeve 9 has end flanges 11 provided with shallow races 12, the sleeve having an intermediate circumscribing race 14. Balls 15 coact with the races 12, balls 16 being received in the intermediate race 14.

Rollers 17 surround the sleeve 9 and bear thereon, the rollers tapering toward their outer ends and being of frusto conical form. The rollers have spindles 18 received between the balls 16, the spindles conforming to the shape of the balls so that the latter may receive the end thrust from the rollers. The rollers 17 are provided with spindles 19 received between the balls 15 and conforming in shape thereto, the balls 15 serving to take up the end thrust from the rollers 17.

Casing members 20 and 21 are provided, these elements having conical surfaces 25 coöperating with the rollers 17. The casing member 21 includes an end wall 22 having a wrench head 23 and an outstanding flange 24. The casing member 20 is supplied with a flange 26 defining an opening 27 through which the shaft 1 passes.

At 28 is shown a rotatable or main member which may be a bearing, a pulley or a wheel of any kind, depending upon whether the shaft 1 rotates or is fixed. The casing members 20 and 21 are threaded at 29 into the main member 28. A nut 31 is threaded on the casing member 21 and engages one side of the main member 28, a nut 30 being threaded on the casing member 20 and engaging the other side of the element 28.

Owing to the way in which the balls 15 and 16 are located with respect to the rollers 17, end thrust will be reduced to a minimum and the rollers will have a truss-like action in sustaining the parts with which they coact.

In Figs. 4, 5 and 6, parts hereinbefore described are designated by numerals previously used, with the suffix "a". The distinguishing characteristics of this form of the invention are that the race 14 is omitted, the sleeve 9ª having tapered or inclined surfaces 32 which coöperate with the rollers 17ª, and there being an intermediate rib 33 on the main member 28ª, the rib having a race 34 receiving the balls 16ª.

In all forms of the invention, the rollers are so supported at their ends by the balls that longitudinal thrust will be taken care of adequately. Any of the bearings shown may be taken down easily for repairs and will operate with a minimum amount of friction and with a small amount of lubricant.

What is claimed is:

1. In a device of the class described, a shaft having a tapered part, nuts on the shaft at the ends of the tapered part; a sleeve wedged on the tapered part of the shaft between the nuts and having end flanges, the sleeve having surfaces which slant in opposite directions toward the flanges; a main tubular member; casing elements threaded into the main member, the main member having an annular internal rib extended between the inner ends of the casing elements, the casing elements having slanting internal surfaces coöperating with the slanting surfaces of the sleeve; first balls coacting with the flanges of the sleeve; second balls interposed between the rib of the main member and the sleeve; frusto-conical rollers coöperating with the slanting surfaces of the sleeve and the casing members, the rollers having reduced outer ends received between the first balls and having reduced inner ends received between the second balls; and nuts on the casing elements and engaging the ends of the main member.

2. In a device of the class described, a sleeve having end flanges and provided with surfaces which slant in opposite directions toward the flanges; a main tubular member; casing elements inserted into the main member, the main member having an annular internal rib extended between the inner ends of the casing elements, the casing elements having slanting internal surfaces coöperating with the slanting surfaces of the sleeve; first balls coacting with the flanges of the sleeve; second balls interposed between the rib of the main member and the sleeve; and frusto-conical rollers coöperating with the slanting surfaces of the sleeve and the casing members, the outer ends of the rollers coöperating with the first balls, and the inner ends of the rollers coöperating with the second balls.

3. In a device of the class described, a shaft having a tapered part; nuts threaded on the shaft at the ends of the tapered part; a sleeve wedged on the tapered part of the shaft between the nuts and having end flanges, the sleeve having surfaces which slant in opposite directions toward the flanges; a main tubular member; casing elements threaded into the main member and having slanting internal surfaces coöperating with the slanting surfaces of the sleeve; first balls engaging the flanges of the sleeve; second balls engaging the sleeve intermediate its ends; frusto-conical rollers coöperating with the slanting surfaces of the sleeve and the casing elements, the outer ends of the rollers engaging the first balls and the inner ends of the rollers engaging the second balls; and nuts threaded on the casing elements and engaging the ends of the main member.

4. In a device of the class described, a sleeve having end flanges and provided with surfaces which slant in opposite directions toward the flanges; a main tubular member; casing elements inserted into the main member and having slanting internal surfaces coöperating with the slanting surfaces of the sleeve; first balls engaging the flanges of the sleeve; a single set of second balls engaging the sleeve intermediate the ends thereof; and frusto-conical rollers coacting with the slanting surfaces of the sleeve and the casing elements, the outer ends of the rollers engaging the first balls and the inner ends of the rollers engaging the second balls.

5. In a device of the class described, inner and outer members; a single line of balls between said members; outer lines of balls between said members; and a double series of rollers between said members, the adjacent ends of the rollers abutting against the single line of balls, and the outer ends of the rollers abutting against the outer lines of balls.

In testimony that I claim the foregoing as my own, I have hereto affixed my signature in the presence of two witnesses.

LAMBERT H. VERVOORT.

Witnesses:
M. B. LAWTON,
I. E. SIMPSON